US010130112B2

(12) United States Patent
Darling et al.

(10) Patent No.: US 10,130,112 B2
(45) Date of Patent: Nov. 20, 2018

(54) METHOD OF MAKING AN ANIMAL FOOD PRODUCT BY CUSTOMIZING THE AMINO ACID PROFILE, INCREASING USABLE ENERGY LEVELS, AND IMPROVING DIGESTIBILITY, AND COMPOSITIONS OF THE METHOD

(71) Applicants: Don Scott Darling, Pender, NE (US); Jonathan Scott Darling, Pender, NE (US); Greg Drollinger, Pierce City, MO (US); Scott Clawson, South Greenfield, MO (US)

(72) Inventors: Don Scott Darling, Pender, NE (US); Jonathan Scott Darling, Pender, NE (US); Greg Drollinger, Pierce City, MO (US); Scott Clawson, South Greenfield, MO (US)

(73) Assignee: INNOVATIVE PROTEIN HOLDING, LLC., Des Moines, IA (US)

(*) Notice: Subject to any disclaimer, the term of this patent is extended or adjusted under 35 U.S.C. 154(b) by 0 days.

(21) Appl. No.: 13/714,535

(22) Filed: Dec. 14, 2012

(65) Prior Publication Data

US 2014/0170297 A1   Jun. 19, 2014

(51) Int. Cl.
*A23K 1/10*   (2006.01)
*A23K 10/26*   (2016.01)
(Continued)

(52) U.S. Cl.
CPC .............. *A23K 1/106* (2013.01); *A23K 10/14* (2016.05); *A23K 10/26* (2016.05); *A23K 20/142* (2016.05);
(Continued)

(58) Field of Classification Search
CPC . A23K 1/04; A23K 1/10; A23K 1/008; A23K 1/007; A23K 1/165; A23L 1/3185; A23L 1/3187
See application file for complete search history.

(56) References Cited

U.S. PATENT DOCUMENTS 2,979,439 A * 4/1961 Kinoshita ............... C12P 13/08
                                                         435/115
3,171,847 A * 3/1965 Aikins ..................... C11B 1/16
                                                         554/23
(Continued)

FOREIGN PATENT DOCUMENTS

AU        199944798 B2    6/2000
CA        2205712         5/1997
(Continued)

OTHER PUBLICATIONS

Griffin Industries MSDS Sheet Identity Blood Meal Mar. 19, 2007 2 pages.*
(Continued)

*Primary Examiner* — Felicia C Turner
(74) *Attorney, Agent, or Firm* — Camille L. Urban; BrownWinick Law Firm (57) ABSTRACT

The method disclosed herein comprises creation of an enzymatic digest medium containing feathers which may be rendered with a meat material to form a product, or may be dried after digestion has reached a desired level and then mixed with a rendered material. The composition disclosed herein comprises a product which, whether used as animal feed or as an additive or flavor to animal feed, provides a product having at least one of an improved amino acid profile, improved digestibility and more desirable levels of protein, lysine, and ash compared to the same amount of a carrier 22 meat with which it is mixed.

16 Claims, 6 Drawing Sheets

(51) Int. Cl.
*A23K 20/142* (2016.01)
*A23K 10/14* (2016.01)
*A23K 50/10* (2016.01)
*A23K 50/75* (2016.01)
*A23K 50/40* (2016.01)
*A23K 50/80* (2016.01)

(52) U.S. Cl.
CPC ............... *A23K 50/10* (2016.05); *A23K 50/40* (2016.05); *A23K 50/75* (2016.05); *A23K 50/80* (2016.05)

(56) References Cited

U.S. PATENT DOCUMENTS

| | | | |
|---|---|---|---|
| 3,617,313 | A | 11/1971 | Harrington, Jr. |
| 3,698,912 | A * | 10/1972 | Winitz ............ A23J 3/30 426/656 |
| 4,307,119 | A | 12/1981 | Robinson, Sr. |
| 4,908,220 | A | 3/1990 | Shih |
| 4,966,733 | A * | 10/1990 | Fernando ............ C11B 1/12 554/10 |
| 5,186,961 | A | 2/1993 | Shih |
| 6,030,649 | A * | 2/2000 | Sawhill ............ A23J 1/002 426/56 |
| 6,174,551 | B1 | 1/2001 | Griffin |
| 6,221,380 | B1 | 4/2001 | Woodroofe |
| 6,329,001 | B1 | 12/2001 | Ivey |
| 2004/0265950 | A1* | 12/2004 | Darling ............ A23J 1/10 435/68.1 |
| 2009/0206186 | A1 | 8/2009 | Morrison |

FOREIGN PATENT DOCUMENTS

| | | |
|---|---|---|
| CN | 200610009626 | 1/2006 |
| GB | 1310232 | 3/1973 |

OTHER PUBLICATIONS

Klemesrud et al. "Complementary Responses Between Feather Meal and Poultry By-Product . . . " J. Animal Sci. 1998 vol. 76 pp. 1970-1975.*

* cited by examiner

| COMPONENT | DIGEST 30 hour cook (dry weight) 8/13/2012 | 30% Composition rendered with chicken meal (dry weight) 10/8/2012 | REG MEAL 5/9/2012 (dry weight) | CHICKEN BYPRODUCT MEAL (dry weight) 5/1/2012 |
|---|---|---|---|---|
| Crude protein | 64.8 | 76.9 | 63.7 | 67.7 |
| Ash | 11.4 | 12.1 | | |
| Sodium | 2.61 | 0.94 | 0.46 | 0.43 |
| Pepsin Digestible protein | | 65.3 | 61.5 | 59.4 |
| Alanine | | 4.62 | 3.83 | 3.91 |
| Arginine | | 4.69 | 4.16 | 4.19 |
| Aspartic acid | | 4.31 | 4.36 | 4.81 |
| Cystine | | 1.77 | 0.51 | 0.85 |
| Glutamic Acid | | 8.00 | 7.96 | 8.58 |
| Glycine | | 5.50 | 5.93 | 5.07 |
| Histidine | | 1.42 | 1.28 | 1.59 |
| Isoleucine | | 2.85 | 1.84 | 2.12 |
| Leucine | | 4.68 | 3.57 | 4.43 |
| Total lysine | | 3.68 | 4.04 | 4.56 |
| Methionine | | 1.11 | 1.23 | 1.20 |
| Phenylalaine | | 3.46 | 2.11 | 2.47 |
| Proline | | 5.47 | 4.37 | 4.22 |
| Serine | | 3.32 | 2.11 | 3.03 |
| Threonine | | 2.76 | 2.33 | 2.69 |
| Tyrosine | | 2.19 | 1.61 | 1.95 |
| Tryptopphan | | 0.56 | 0.36 | 0.39 |
| Valine | | 3.99 | 2.05 | 2.67 |

FIG 6

METHOD OF MAKING AN ANIMAL FOOD PRODUCT BY CUSTOMIZING THE AMINO ACID PROFILE, INCREASING USABLE ENERGY LEVELS, AND IMPROVING DIGESTIBILITY, AND COMPOSITIONS OF THE METHOD

FIELD OF INVENTION

The present invention relates in general to protein-containing substances employed as feed or feed additives for animal food. Specifically, a composition and a method of making the composition are disclosed that combines a product of liquefaction of feathers and blood and, optionally, offal with by-product meal or other rendered products.

BACKGROUND

According to the Association of American Feed Control Officials (AAFCO) "meal" is defined to be "a dry-rendered product" from the exact same definition as "whole meat". Essentially, it is the same product, only in a dried form. Whole meat contains about 70% water, leaving the meat to contain about 18% protein, and 5% fat. By removing the moisture, meal may have between about 1% and 10% and up to 20% water, in the neighborhood of 50% protein and above, and about 10%-15% fat.

Rendering is a process that converts waste animal tissue into stable, value-added materials. Rendering can be carried out on an industrial, farm, or kitchen scale. The general process is centuries old and has been carried out for many centuries, primarily for soap and candle making. The earliest rendering was done in a kettle over an open fire. This type of rendering is still done on farms to make lard (e.g. pork fat) for food purposes.

With the development of steam boilers, it was possible to jacket the kettle to make a higher grade product and to reduce the danger of fire. A further development came in the nineteenth century with the use of the steam "digester" which was simply a tank used as a pressure cooker in which live steam was injected into the material being rendered. This process is a wet rendering process called "tanking" and was used for both edible and inedible products, although the better grades of edible products were made using the open kettle process. After the material is "tanked", the free fat is run off, the remaining water ("tank water") run into a separate vat, and the solids removed and dried by both pressing and steam-drying in a jacketed vessel.

Next, continuous dry processes were introduced. Then, in the 1980s, high energy costs popularized the various "wet" continuous processes. These processes were more energy efficient and allowed the re-use of process vapours to pre-heat or dry the materials during the process.

The majority of tissue processed in rendering plants comes from slaughterhouses. The rendered material can include the fatty tissue, bones, and offal, as well as entire carcasses of animals. The most common animal sources are beef, pork, sheep, and poultry. The rendering process simultaneously dries the material and separates the fat from the bone and protein. A rendering process typically results in a fat which may include yellow grease, choice white grease, or bleachable fancy tallow, etc. and a protein meal which may be any of meat and bone meal, poultry byproduct meal, etc. Animal by-product meal consists of rendered animal tissues that don't contain hair, horns, hoofs, hide trimmings, manure, or intestinal contents or extraneous materials. Poultry (or chicken or turkey) by-product meal: consists of ground, rendered, clean parts of the carcass of slaughtered poultry such as necks, feet, undeveloped eggs and intestines. It cannot contain feathers. Rendering plants often also handle other materials, such as slaughterhouse blood, feathers and hair, but do so using processes distinct from true rendering.

When the rendering product will be incorporated in food products or pet foods, the rendering is most often carried out in a continuous process or batch process. This helps to maintain the integrity of the proteins and amino acid profiles. The edible fat materials (generally fat trimmings from meat cuts) are heated, and then the fat is separated often using two or more stages of centrifugal separation. The solids separated from the fat may be used in food products, pet foods, and others products depending on the original materials. The separated fat may be used in food products, or if in surplus, it may be diverted to soap making operations.

An alternative process cooks slaughterhouse offal to produce a thick, lumpy "stew" which is then sold to the pet food industry to be used principally as tinned cat and dog foods. Such plants are notable for the offensive odor that they can produce and are often located well away from human habitation.

U.S. Pat. No. 7,329,425 discloses a process for on-site digestion of spent hens employing an enzymatic digest within a given range of pH, temperature and enzymes. U.S. Pat. No. 7,226,425 discloses apparatus designed to process spent hens, which apparatus optionally includes means to store, alter the pH of, and mix an enzyme digest; grind spent chickens and combine with the enzyme digest; circulate ground spent hens along with the digest through a chopper pump and allow digestion to progress, and thereafter dry the product. The enzyme digest comprises blood, enzyme, inedible egg. Another means of achieving the digested products includes a digest comprising blood, enzymes, and offal. Feathers, heads, backs, necks and wings may be included in the digest process and the result may or may not be dried. The result of this digest is rich in protein and amino acids.

Poultry by-product meal, as mentioned herein, has long been known to contain an amino acid profile energy content, total lysine content and ash content which is suitable for animal feed but could be improved dramatically if the total energy content could be increased, or the amino acid profile tailored to the end use, or the ash content reduced. Poultry byproduct meal includes a variety of advantages when used as an animal feed or feed additive but is certainly not the only possible source.

The present invention differs from the above referenced inventions and others similar in that these prior compositions do not allow for or provide a method for controlling or tailoring amino acid profiles, ash content or total energy content in animal feeds such as pet foods. To date, pet foods that include rendered products as additives have a relatively high ash inclusion. It would be desirable for the additive or ingredient to include a higher level of usable (digestible) protein (e.g. lower molecular weight) and a higher available energy content and a lower ash content than poultry byproduct meal, other rendered products, or chicken meal.

What was needed was a feed additive having an adjustable amino acid profile which is also palatable to the animals to which it is fed, which is easily stored, and predictable in animal food value, and which can be used to customize certain food values of an animal feed.

The objectives of the present invention are, together or separately, to provide a feed additive or flavor product which allows animal feed to comprise predictable and tailored usable energy content; altered and beneficial amino acid profiles, lower ash content; higher total lysine; and lower molecular weight than typically expected for feed resulting from a rendering process.

SUMMARY

One embodiment of the present invention combines an enzymatically digested blood and feather mixture (composition) dried or not, with a poultry by-product meal or any meat product that may produce fat when rendered (to form a "product"). This combination produces a product which may be used as an additive for animal feeds or an animal feed. The enzymatically digested blood and feather mixture (aged digest medium) preferably includes a profile lower in ash than the combination of feathers and blood when not digested, lower molecular weight compared to a by-product meal, higher total energy, and an increase in total lysine over that expected when not digested. The enzymatic digest may be provided separately or may be combined with other materials such as poultry byproduct meal. The poultry byproduct meal preferably includes a normal and predictable, within range, amino acid profile. Upon blending with the enzymatic digest in liquid form with poultry byproduct meal, the amino acid profile, ash level, and energy content can be customized.

Alternatively, when the digest is added to a rendering process e.g. blended with the meat as it goes into a cooker to be rendered, the final rendered product may contain between about 3% and about 10% moisture. The moisture range is driven by desirable taste, storage and handling characteristics. The ash level and protein level of the rendered product, along with the desired amino acid profile can be engineered within certain ranges to be more favorable than poultry by-product meal or other rendered meat product alone. These characteristics can be engineered by a combination of digest conditions, rendering conditions, and a ratio of digest medium added to the chicken byproduct meal or other rendered meat product or chicken meal, porcine meal and many other protein carriers 22.

Alternatively, the aged digest medium may be dried to form the composition and later blended with previously rendered products to produce a product that achieves these results. The combination may be achieved through a process that combines separate stages.

A first stage digests blood of a slaughtered animal along with feathers to form a digest. The digest may or may not contain other animal parts. The second stage subjects the digest to a drying process thereby producing a composition that may be used as a feed additive having an amino acid profile higher in lysine than rendered materials and a higher usable energy and digestibility level along with a lower ash level than rendered materials such as poultry byproduct meal. The third stage comprises blending the dried digest composition with poultry byproduct meal or another rendered or unrendered animal feed material to form an animal feed or feed additive or feed supplement product.

The blended product is created by selecting ratios of dried digest and rendered or unrendered material targeted to result in an animal feed having one or more specific characteristics such as an increase in usable energy, or a decrease in ash level, or a more favorable amino acid profile comprising higher levels of lysine. By adjusting the amounts, times, temperatures and other conditions of the digest process to form the composition, one can manipulate the amino acid profile, energy content, ash content and flavor of the final rendered product which can then be used as an ingredient in animal food products.

Figure 6:
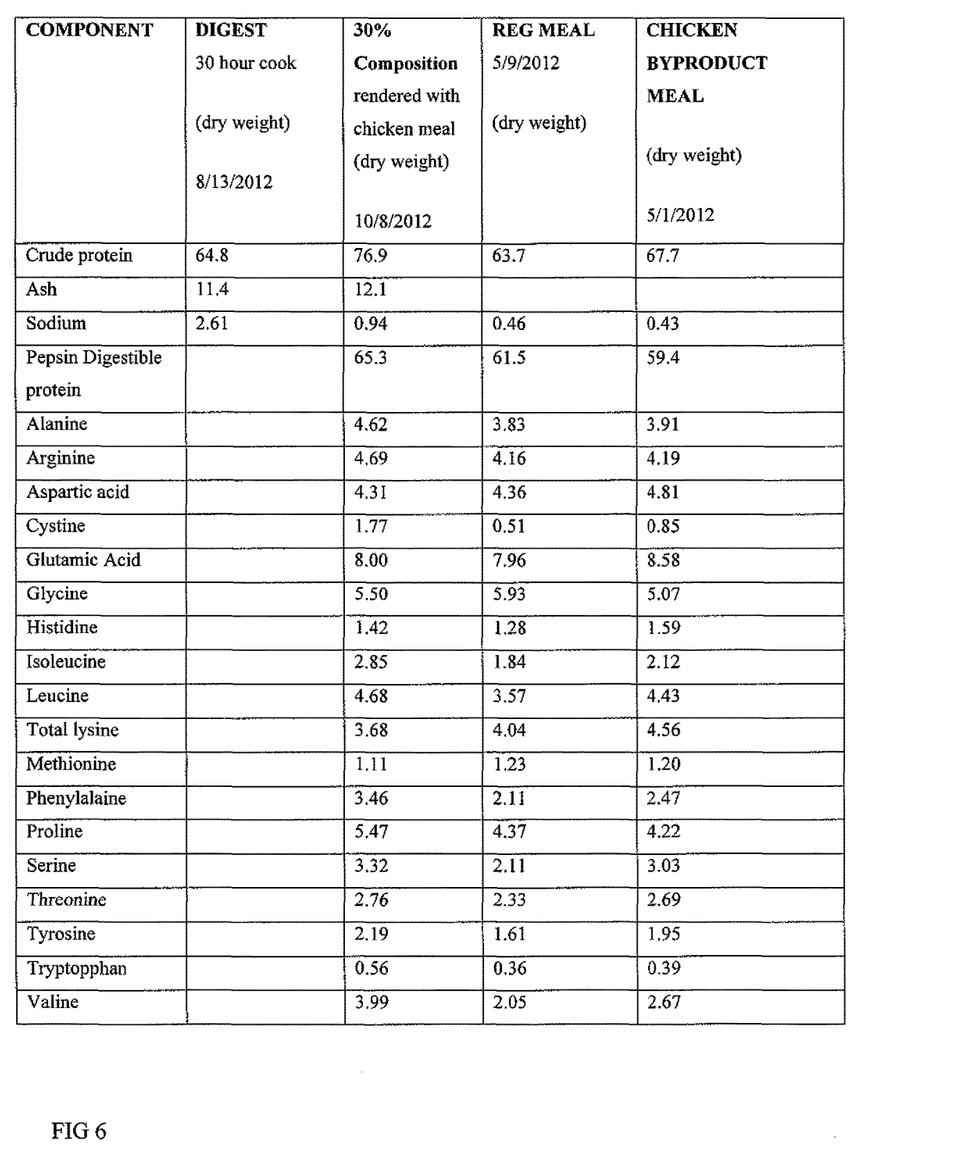
FIG. 6 is a table showing an amino acid profile and other characteristics of the Composition, of Chicken ByProduct Meal, and of one embodiment of a Product

An example nonlimiting amino acid profile of chicken byproduct meal is provided at FIG. 6 in comparison with the product of the invention wherein chicken was mixed with the digest medium of the present invention at a 30% inclusion rate and rendered together and in comparison to the digest alone at 30 hours cook time. The inclusion rate of the digest medium may be varied to accomplish different objectives; the table provides one such example.

An embodiment contemplates rendering the meat product or carrier with the digest. When compared to a typical rendered meat product (a "carrier"), the rendered combination of meat and digest (together, after rendering, the "final rendered product") will have lower ash content, higher protein content, a more favorable amino acid profile, higher digestibility (higher total digestible nutrients) and higher energy content.

More specifically, the final rendered product is rendered to a moisture level preferably between about 2% and about 10%, and most preferably to between 3% and 7%, or around 5%. The inclusion of the digest with the carrier to be rendered together may be anywhere between about 2% and about 72%. In addition, the final rendered product (digest rendered with chicken) may include the following general profile: around 65% pepsin digestible protein, around 72% or above crude protein, in the neighborhood of 11-12% ash. The final rendered product or the product (dried composition) is stored at a pH level between about 6 and about 8. For ease of storage, the composition and the final rendered product may or may not include a preservative and/or may be stored in a silo or other storage container. Storage time without damaging degradation may be increased where storage temperatures are below room temperature or where moisture is kept to a minimum.

The table at FIG. 6 compares the composition to composition and chicken meal at a ratio of 3:7, and to chicken by-product meal.

The product (which is the composition combined with rendered material) or final rendered product (rendered together with meat material) can be fed to nearly any animal that is able to digest rendered meat proteins. Specifically, but not exclusively, companion animals such as dogs, cats, ferrets, felines as well as livestock in the nature of feline (such as mink), piglets, poultry, ruminants, and aquacultured crop animals. The composition (dried aged enzymatically digested blood and feathers), or product or final rendered product product may be fed in frozen, fresh, moist or dry form and may be fed alone or in combination with additional nutrients or supplements, or with meat carrier, as needed or desired. The composition or aged digest can be used to customize the protein profile of rendered or other carrier. The blend of the digest composition or the product with cereals or grains can also provide a beneficial nutrient profile.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

Example embodiments are described in detail below with reference to the attached drawing figures, wherein.

DESCRIPTION OF EMBODIMENTS

In example embodiments, a digest medium 14 may be prepared by mixing together blood 2 with a preservative 4 and an enzyme 8 and combining the digest medium 14 with feathers 10. Examples of preservative 4 usable with example embodiments include, but are not limited to, sorbic acid, butylated hydroxytoluene, ascorbic acid, ethoxyquin, sodium metabisulfite, sodium nitrite, tocopherols. Examples of enzymes usable with example embodiments include, but are not limited to, several of the many amylases, proteases such as pepsin and serine proteases, lipase, keritinase, papain, alkaline proteases, liquid bromelain, bacillus amyloliquifaciens, and bacillus licheniformis protease. In example embodiments, the blood may be from various kinds of animals including, but not limited to, birds (for example, chickens and turkeys), pigs, cattle, and sheep. Example embodiments, however, are not limited by the aforementioned examples. For example, blood usable with example embodiments may also include blood from any source.

Figure 1:
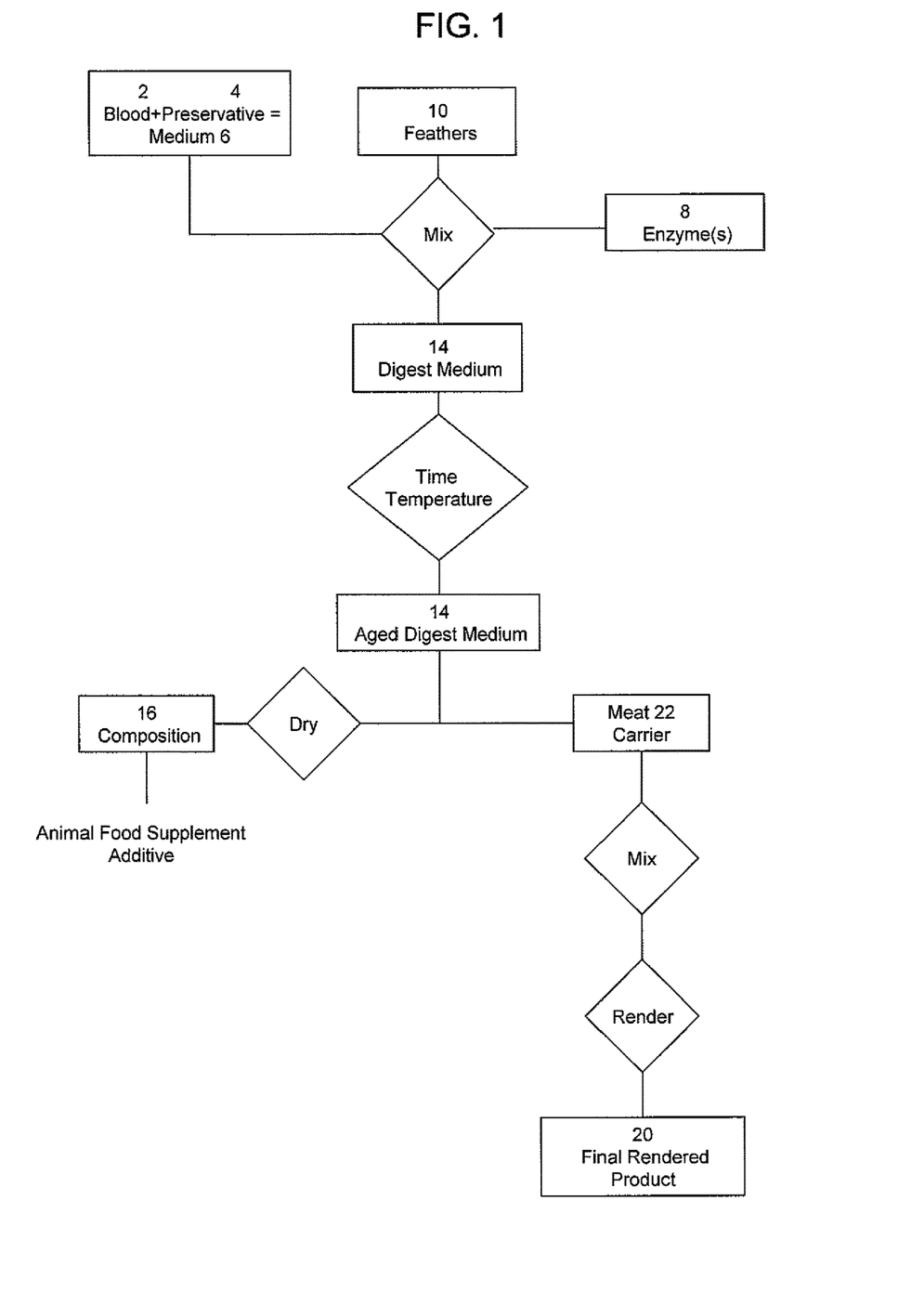
FIG. 1 is a flowchart illustrating a method of producing an enzymatic digest in accordance with example embodiments.

FIG. 1 is a flowchart of a method for producing a digest. In FIG. 1, the process begins by mixing together 100 blood 2 with a preservative 4 to form a medium 6. The blood 2, for example, may be collected at a rendering plant. In example embodiments, the medium 6 may be stored for a relatively long period of time due to the presence of the preservative 4. For example, the medium 6 may be stored for about 3-4 weeks, and up to about 11-12 weeks depending on conditions such as temperature and storage. In example embodiments, the medium 6 may be stored at a rendering plant or shipped from a rendering plant to a secondary site where it may be used to form a digest medium 14. In example embodiments, the digest medium 14 may be formed at the rendering plant or may be formed at the secondary site.

In example embodiments, the digest medium 14, according to the method of FIG. 1, may be prepared by combining the medium 6 with feathers 10 and an enzyme 8 or a mixture of enzymes 8. The feathers 10 may be produced at a rendering plant. For example, the feathers 10 may be from freshly killed animals. On the other hand, the feathers 10 may be stored for a relatively long period of time and then combined with the medium 6 and the enzyme 8. In example embodiments, because the feathers 10 are not required to be from a freshly killed animal, the feathers 10 may be combined with the medium 6 and the enzyme 8 or mixture of enzymes 8 at a location other than at the rendering plant. Once the medium and feathers digest, the result is referred to as the composition.

In example embodiments, the feathers 10 may be stored and/or transported in a transportation device, for example, a truck. The feathers 10 may be moved from the transportation device to a reducer via a transporting device, for example, a conveyer belt or an auger. Thus, in example embodiments, the feathers 10 may be provided 200 by the transportation device and then transported from the transportation device to the reducer via the transporting device. During a manufacturing process in which the feathers 10 are produced certain metal pieces or other nonfeather-based materials may be inadvertently mixed with the feathers 10. The metal pieces are undesirable for mechanical and process reasons, and nonfeather materials may also be mechanically or chemically problematic. Further, metal pieces of this nature can not be fed to animals; other "trash" if expected to have negative effects if ingested should also be removed, especially if it is expected that the enzymatic process will not remove the possible negative effects. Thus, in example embodiments, the feathers 10 may be optionally passed through a metal detector. In the event metal is detected, the feathers 10 may be inspected for the metal and the metal may be removed. For example, the metal may be removed manually. The feathers may also be shaken to sift materials of lighter and heavier density to the top and bottom respectively, and thereafter the nonfeather materials might be removed or might be removed via a sifting or other mechanical or electromechanical or magnetic process.

In example embodiments the feathers 10 may be transported, for example, by an auger or conveyer belt, to the reducer or may be directly provided to the reducer from the transporting device or may be stored prior to providing to the reducer. The reducer may comprise a crusher or roller or combination thereof to reduce feather pieces to smaller sizes 300. In the alternative, the feathers 10 may be transported to a shredder, or an apparatus having a knife/anvil characteristic, such as a meat grinder, to shred and/or grind the feathers 10. In either case, the sizes of the feathers 10 may be reduced to between about ½ and 1 inch pieces, but may also be smaller, or a bit larger as this is an inexact operation and high consistency in feather particle size is not critical. In a preferred embodiment, although it is preferred to remove metal particles before feathers enter the reducer, metal may be removed either before the reducer, or as a second metal removal activity. A second metal detector may follow the particle reducer or shredder and additional detected metals may be removed from the crushed or shredded feathers 10.

In example embodiments, the feathers 10 may be combined with the medium 6 which includes an enzyme 8 or mixture of enzymes 8 to form the digest medium 14. For example, the feathers 10, the medium 6, and the enzyme 8 may be combined and mixed in an inline grinder that includes a pumping mechanism for moving the combination to the next stage. In example embodiments, the ratio of blood 2 in the medium 6 to feathers 10 may be about 1 to 2. In another embodiment, the medium 6 may be mixed, with an enzyme 8 or enzyme 8 mixture first, and then with feathers 10. In yet another embodiment, the medium 6 may be mixed with an enzyme 8 or enzyme 8 mixture and then with feathers 10 and, optionally, another enzyme 8 or enzyme 8 mixture. The mixture of enzymes 8 will be selected based on the desired resulting product and the raw materials to be digested.

Grinding the feathers 10 increases feather surface area making them easier to digest. In example embodiments, once ground and combined with the medium 6 and enzyme 8, the feathers 10, the medium 6, and the enzyme 8 may be piped or augered to a storage tank. The storage tank is preferably equipped with mixing, agitating or recirculating capabilities, and temperature control in order to assist in digestion to the degree desired. Although the temperature and time necessary for digesting depends on the status of the digest when it enters the tank with regard to particle size and temperature, the digest is typically recirculated for between about 12 and about 36 to about 48 hours and up to about 72 hours if producing in batch mode. Furthermore, during digestion, the temperature of the digest 14 may be maintained within a range of about 90 to about 120 degrees F. or as dictated by the selected enzymes 8 and desired speed of reaction. If pieces of material in the digest 14 are relatively large, the digest may be emulsified at some point or points during the digestion period. The size of the digestion tank will dictate the type and the placement of agitation mechanism(s). The rate of digestion may be effected by the temperature, the amount and type of enzyme 8, and the surface area available for digestion. The desirable set up will be cost effective, using these characteristics, and the tank characteristics, and preferably provides a pumpable digest medium once digestion is complete. Typically, holding temperature constant, time to digest to a certain size can be shortened by adding enzyme 8. In example embodiments, digestion may be considered complete when all of the feathers 10 are digested regardless of average molecular weight. In other embodiments, digest will be considered finished when it reaches a target average molecular weight.

In example embodiments, digestion may be carried out in a vertical cone bottom tank having a jacketed cone or double outer wall. The tank may be heated with hot water or steam and may have an insulated exterior to increase the efficiency of the heating process and provide safety for people who may be nearby the tank. Furthermore, the tank may be made of a suitable material such as stainless steel. The tank may also include a mechanical agitator (such as a stirring mechanism) or a hydro-mechanical recirculation system comprising various pumps and pipes.

Figure 2:
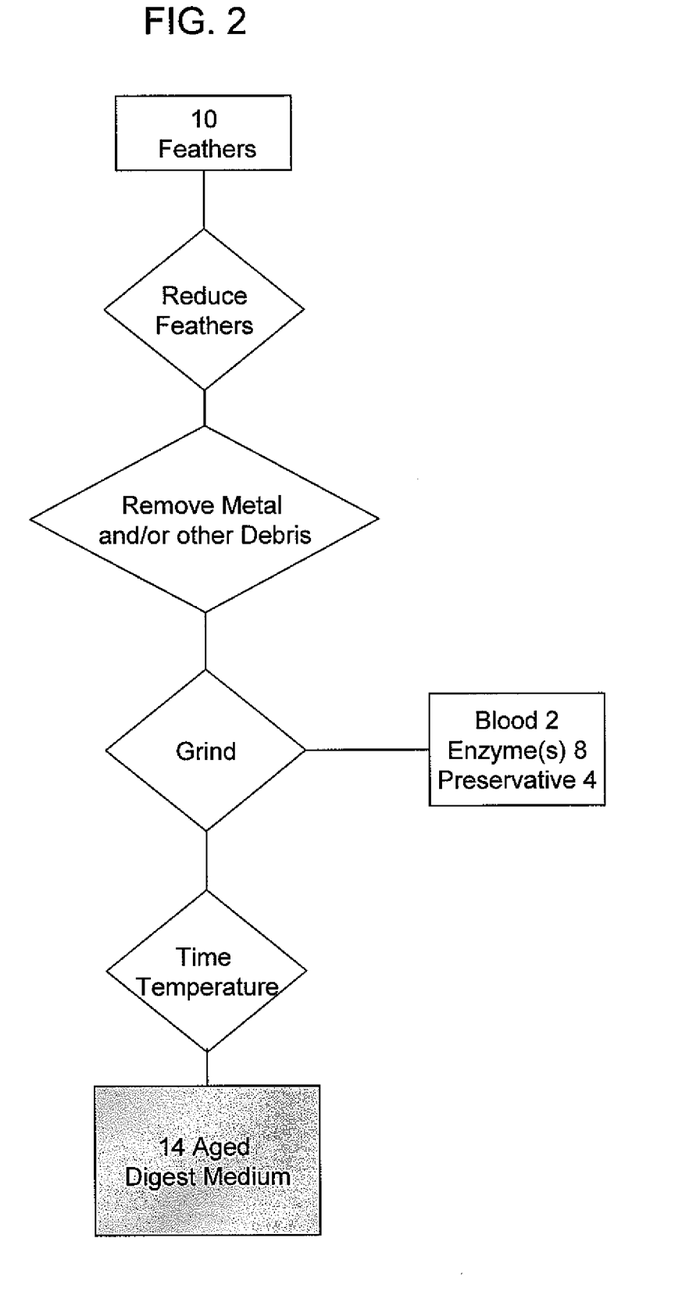
FIG. 2 is a flowchart illustrating a method of producing an enzymatic digest in accordance with example embodiments.

Example embodiments are not strictly limited by the method of FIG. 1. For example, as shown in FIG. 2, a digest medium 14 comprising blood 2, a preservative 4, and an enzyme 8 may be prepared and stored in a storage tank. The process of FIG. 2 may be similar to the process in FIG. 1 in that the process of FIG. 2 includes the steps of providing feathers 10, transporting the feathers 10, reducing the size of the feathers 10, and checking the feathers 10 for metal which may be substantially similar to the steps of providing feathers 10, transporting the feathers 10, reducing the size of the feathers 10, and checking the feathers 10 for metal illustrated in FIG. 1. However, in FIG. 2, the ground feathers 10 are combined with the digest medium rather than the medium 6 and enzyme 8 as shown in operation of FIG. 1. Like the process of FIG. 1, the process of FIG. 2 may also include the operations of grinding the feathers 10 in the presence of the digest medium, and aging the feathers 10 and digest medium 14 which are substantially similar to the steps of grinding the feathers 10, medium 6, and enzyme 8 and aging to form the aged digest medium 14 wherein the feathers 10 are thoroughly digested. The medium 6 of blood 2, preservative 4, and feathers 10 may be stored for several days or weeks prior to addition of enzyme 8 or enzymes 8 to create the digest medium 14.

Example embodiments are not intended to be limited by the operations illustrated in either FIG. 1 or 2. For example, in FIG. 2, an aged digest may be combined with the feathers 10. Enzymes 8 employed may be selected by one of ordinary skill in the art in accordance with objectives. An example would be Altech's Alkaline Protease which may be added at a rate of about 10 lbs/ton and works well with keritinase at a temperature between about 90 and 100 Fahrenheit to effect digestion in about 20 minutes or so.

Figure 3:
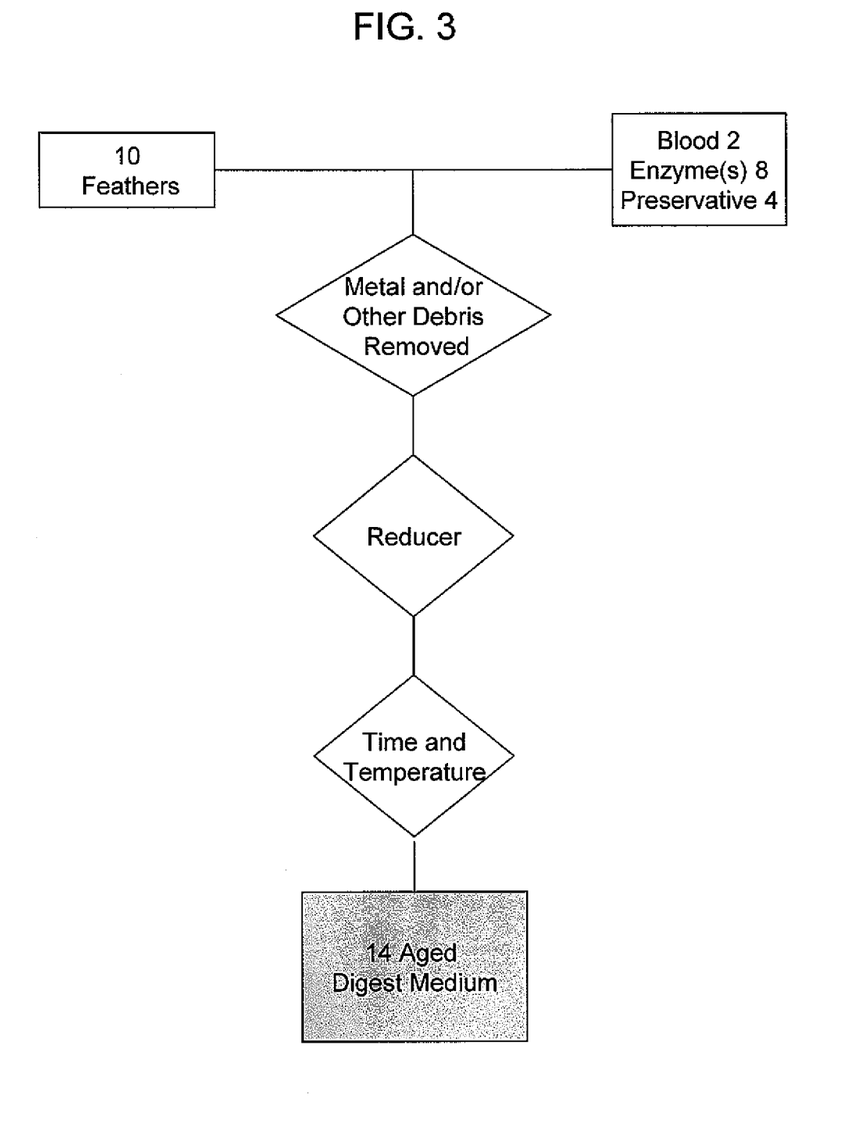
FIG. 3 is a flowchart illustrating a method of producing an enzymatic digest in accordance with example embodiments.

FIG. 3 provides another example of preparing a digest 14 in accordance with example embodiments. In FIG. 3, the process begins by providing a digest medium 14. As in the previous example, the digest medium 14 may be prepared by mixing blood 2 with an enzyme and a preservative 4. In example embodiments, feathers 10 may be added to the digest medium. The combined feathers 10 and digest medium may be transported to a reducer (for example, a roller, crusher, or a shredder) to reduce the size of the feathers 10 (for example, to sizes of about ½ inch to about 1 inch). Prior to this step, the feather-digest medium 14 mixture may be checked for metal and the metal may be removed. After the feathers 10 are reduced in size, the mixture of the feathers 10 and the digest medium 14 may again be inspected for metal and, in the event metal is detected, the metal may be removed. After the metal is removed, the digest medium 14 mixture may be sent to a mixer for mixing and the resulting mixture pumped or augered to a holding tank for digesting. In example embodiments, the holding tank may include the mixer, thus, in example embodiments, transporting the digest medium 14 to the mixer may be identical to transporting the digest medium 14 to a holding tank. As in the previous example, the holding tank may include a recirculation system and a heating system and the digest medium 14 may be heated and recirculated consistent with the earlier described embodiments to form an aged digest medium where the feathers 10 are thoroughly digested.

Figure 4:
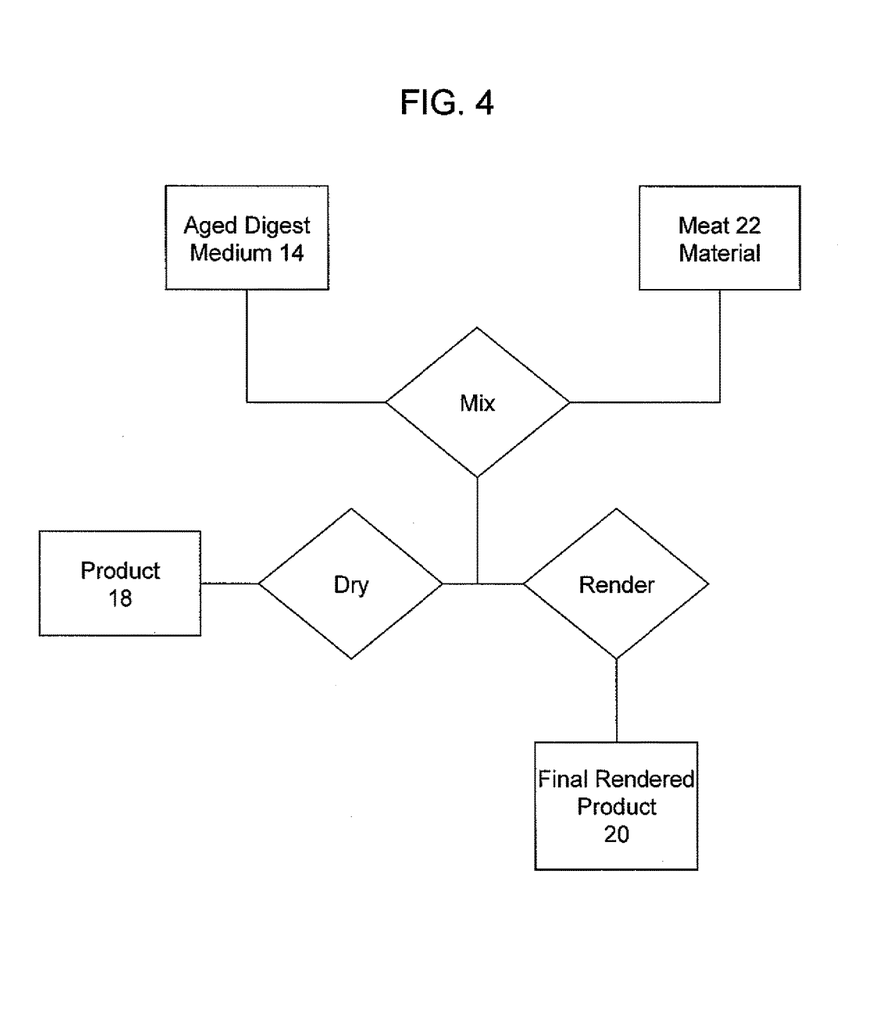
FIG. 4 is a flowchart illustrating a method of producing a final rendered product in accordance with example embodiments.

In example embodiments, the aged digest medium 14 may be dried to form the composition which may be used as a food product. On the other hand, the aged digest medium may be combined with other materials to produce other food products. For example, as shown in FIG. 4, the aged digest medium 14 may be combined with a meat material 22 to form a food product 18. The meat material 22, for example may be a product(s) of a rendering process or any part of an avian carcass. The meat material 22, may include other forms of meat. For example, in this application, meat material may include that associated with, but not limited to, poultry by-product meal, turkey meal, chicken meal, porcine meal, meat and bone meal, and fish meal. Of course, chicken or beef, for example, dried chicken and dried beef, or frozen chicken or frozen beef, may be used as the meat material. In example embodiments, as shown in FIG. 4 the meat 22 and the aged digest medium 14 may be combined in a rendering cooker and may be cooked for a period of time, which can be between 45 minutes and 1½ hours, but the time is dependent to some degree upon the equipment used, the age of the meat, the moisture in the material to be rendered and the quality of the steam employed which are all normal rendering variables the selection of which are within the purview of one of ordinary skill in the art. If desired, flavors or colors may be added at this point, or after rendering is complete. In this process fat may be removed via a fat removal step, such as decanting (See FIG. 5). The cooking process may be conducted in a manner well known in the art of rendering to remove water from the aged medium/meat mixture to form a final rendered product 20 having a moisture level of about 3% to about 10%, for example, about 5%. The resulting final rendered product 20 is a high protein food product, feed additive or flavor which may be usable as a food product for various types of animals, for example, chickens, companion animals, aquacultured and other livestock including ruminants, feline and porcine.

Figure 5:
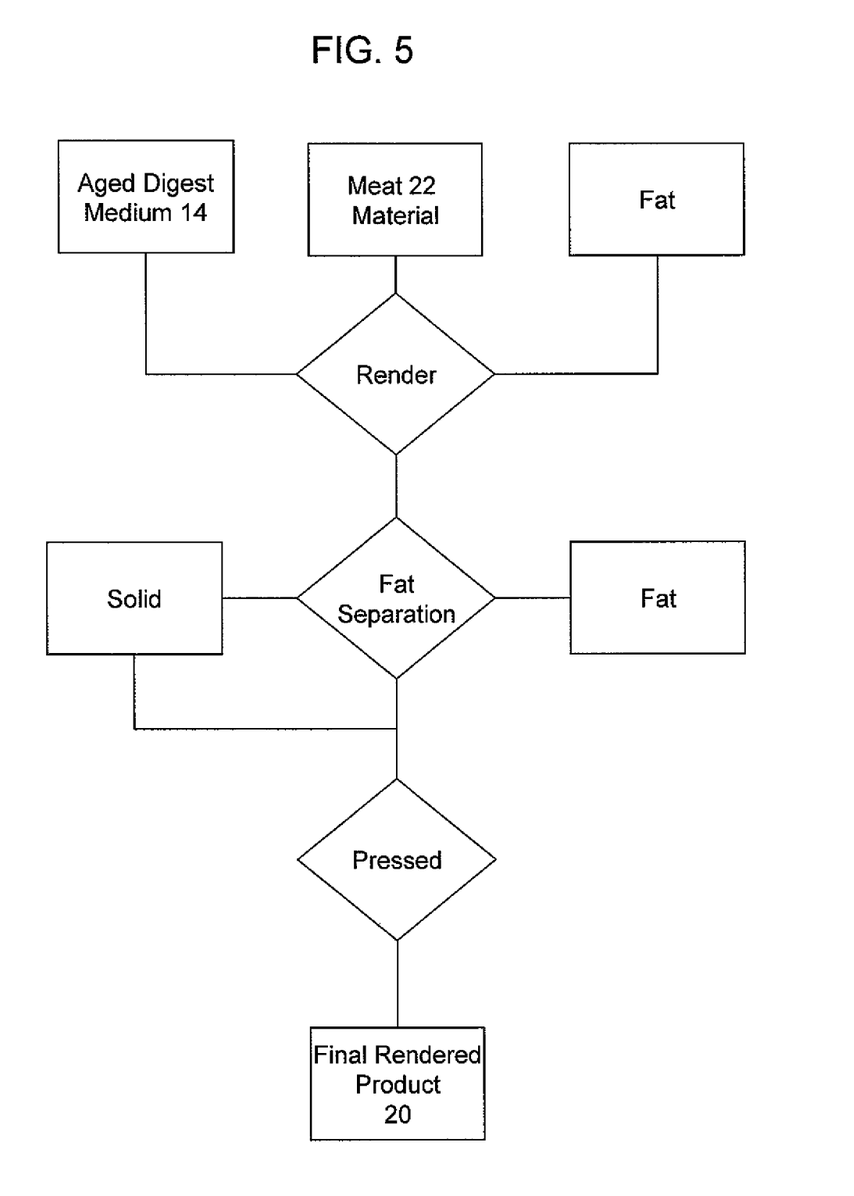
FIG. 5 is a flowchart illustrating a method of producing a product in accordance with example embodiments.

FIG. 5 is another example of a method usable for creating a final rendered food product using an aged digest 14 that may be produced by the methods of FIGS. 1-3. As shown in FIG. 5, the aged digest medium 14 may be combined with meat 22 of one type or a variety and fat. The combined aged digest 14, meat 22, and fat mixture may be cooked in a rendering cooker as is known in the art. To create the aged digest, meat 22 may be ground prior to digesting or in pieces; the mixture may or may not be agitated during cooking. In a continuous addition process, the preferred temperature is around 110 Fahrenheit but may vary between about 90 and about 120 Fahrenheit and the process typically requires between about 24 and 36 hours. If using a batch process, the cook time may be up to around 72 hours depending on the desired average molecular weight. The time required may be reduced by adding additional enzyme 8. To render the aged digest 14 and meat together, a short 45 minute to 1½ hours process at between about 350 and about 285 Fahrenheit may be used. During the cooking process a fat layer may be produced and the fat may be removed via a fat separation process. The fat layer, for example, may be decanted. Thus, the fat, meat 18, and aged digest medium 14 mixture may be separated into a meat layer and a first fatty layer. The first fatty layer may be placed in a centrifuge and centrifugation may be used to separate the first fatty layer into a second fatty layer and a solid layer. In example embodiments, the second fatty layer may be separated from the solid layer and the second fatty layer may be stored as fat. The solid layer may be added back to the meat layer to form a meat/solid layer final rendered product 20. In example embodiments, the meat/solid layer final rendered product may be pressed and the pressed meat/solid layer final rendered product may then be sent to a grinding room or a hammer mill for processing. The processed pressed meat/solid layer may then be stored in a silo. Like the previous example, the processed pressed meat/solid layer rendered product 20 may be a food product with a relatively high protein content and thus may be usable as an animal feed, feed additive or flavor.

Applicants have discovered that the moisture content of the cooked meat/solid layer rendered product 20 should be about 2% to about 10% moisture, for example, about 3% to about 5%. In the event the moisture content is below about 2%, the taste is of poor quality. In the event the moisture content is above about 10%, the product 20 deteriorates more quickly than typically desired but such levels may be acceptable if stored in sterile conditions, appropriate preservative 4 are added, or if the product 20 is to be used soon after production.

In example embodiments, a digest medium 14 may be formed by adding at least one enzyme 8 to the medium 6 comprising blood 2 and feathers 10 and the digest medium 14 may be used to digest certain biological products. The selection of enzyme or enzyme combinations 8 is made with an eye toward what will be added to the digest medium 14 and expected to be digested e.g. the combination of protein, fat, bone, cartilage, feathers 10, offal, etc. Example embodiments contemplate feathers 10 will be included in the digest medium 14. Example embodiments contemplate that feathers 10 will be the primary source and/or the only source of protein in the digest medium 14.

Shown in FIGS. 4 and 5, the digest 14 and carrier 22 together are rendered to a moisture level preferably between about 2% and about 10%, and most preferably to between 3% and 7%, or around 5%. The inclusion rate of the digest 14 with the carrier 22 includes anywhere between about 2% and about 49%. In addition, the digest 14 rendered with chicken meat product as a carrier may include the following general profile: about 65% pepsin digestible protein, about 77% crude protein, and about 12% ash while the carrier alone (chicken byproduct meal) may have a pepsin digestibility more along the lines of about 60% and crude protein levels around 68% and ash levels around 20%. Chicken meal alone shows pepsin digestible protein level about 62% and crude protein around 65%-68% and ash levels around 20%. The rendered final product 20 is best stored at a pH level of about neutral. For ease of storage, the product 20 may include a preservative and/or may be stored in relatively airtight containers at near room temperature or, preferably cooler to retard bacterial, mold and fungal growth.

The above methods produce an animal food product with desirable properties. The first comprises blending the dried digest composition 16 with a carrier 22 which may or may not be meat, grain, vegetable to form a product 18 and the second comprises rendering the digest 14 together with a meat which may be used as the final rendered product 20 or may be combined with additional rendered or unrendered meat material and/or with grain or vegetable materials to form a final animal food product. For example, the food products produced by the above methods have been found to be low in ash and high in digestible nutrients and lysine, and of increased palatability, when compared to similar conventional food products.

Thus, the present invention has been described in an illustrative manner. It is to be understood that the terminology that has been used is intended to be in the nature of words of description rather than of limitation.

Many modifications and variations of the present invention are possible in light of the above teachings. For example, time for digestion may be effected by the amount of enzyme or the temperature. The amino acid profile of the product is dependent upon the ratio of composition added to the rendered meat material or the ratio to the meat material prior to rendering the meat and composition together. The meat material may be nearly any material containing an amino acid profile. Grains or other non-meat materials may be used in addition to meat materials in combination with the composition. Therefore, within the scope of the appended claims, the present invention may be practiced otherwise than as specifically described.

We claim:

1. A method of making an animal food product, comprising:
   forming an aged enzymatic digest by grinding feathers in the presence of blood and at least one enzyme combining the aged enzymatic digest with a meat material to form a mixture;
   digesting the mixture through a digest process;
   controlling amino acid profile, ash content, and total energy content in the animal food product by adjusting amounts, times, and temperature of the digest process;
   rendering the mixture in a cooker to form the food product;
   and
   wherein said animal food product comprises an amino acid profile which contains a total lysine content higher than the lysine content of the mixture when rendered without said aged enzymatic digest.

2. The method of claim 1, wherein the aged enzymatic digest comprises combining more than one enzyme and a plurality of feather pieces and allowing time for substantially complete enzymatic digestion of said feather pieces prior to combining the aged enzymatic digest with the meat material.

3. The method of claim 2, wherein said at least one enzyme are selected from the group consisting of papain, pepsin, keritinase, protease, and amylase.

4. The method of claim 1, wherein the animal food product is further combined with at least one additional component prior to feeding.

5. The method of claim 1, wherein the meat material comprises poultry by-products.

6. The method of claim 1, wherein the level of metabolizable energy of the food product is higher than the level of metabolizable energy of the rendered meat material when rendered without said aged enzymatic digest.

7. The method of claim 1, wherein said meat material includes at least one of a group consisting of fowl, meat, porcine, and fish.

8. The method of claim 1, wherein said aged enzymatic digest results from a process comprising combining a plurality of feather parts, at least one enzyme, and blood and holding the digest between 100° F. and 120° F. for at least 12 hours.

9. The method of claim 1, further comprising:
rendering the aged enzymatic digest with said meat material until a moisture level of the mixture is about 2% to about 10% to form a final rendered product.

10. The method of claim 9 wherein rendering said mixture produces separable fat.

11. The method of claim 10, further comprising:
separating said fat from the remaining mixture to form a first fatty layer and a meat layer.

12. The method of claim 11, further comprising:
centrifuging the first fatty layer to form a second fatty layer and a solid layer and adding the solid layer to the meat layer to form a meat-solid layer composition.

13. A method of producing a low ash product suitable for use as animal feed, feed additive, or flavor comprising:

a) Creating a composition comprising an aged enzymatic digest comprising a plurality of animal slaughter by-products and at least one enzyme, wherein the plurality of animal slaughter by-products comprises feathers and feather pieces;

b) Allowing said plurality of animal slaughter by-products to become at least partially digested through a digest process;

c) Controlling amino acid profile, ash content, and total energy content of said composition by adjusting amounts, times, and temperature of the digest process;

d) Combining said composition with materials to be rendered; and e) Rendering said composition to produce a final rendered product having a moisture content between about 2% and about 10%.

14. The method of claim 13 wherein said product is combined with at least one from the group consisting of fish meal, poultry meal, poultry by-product meal, porcine meal, dried beef, dried chicken, and meat and bone meal to form a low ash animal feed compared to feed made without said product.

15. The method of claim 13 wherein said product is combined with poultry by-product meal to form an animal feed having a higher total lysine content, a higher total energy, and a lower ash content than the same amount of poultry by-product meal alone.

16. The method of claim 13 wherein said enzymatic digest is held at a temperature between about 100° F. and 115° F. for a time adequate to obtain a pre-determined average molecular weight.

* * * * *